United States Patent [19]

Kessler

[11] Patent Number: 5,289,542
[45] Date of Patent: Feb. 22, 1994

[54] CALLER IDENTIFICATION SYSTEM WITH ENCRYPTION

[75] Inventor: William K. Kessler, Indianapolis, Ind.

[73] Assignee: AT&T Bell Laboratories, Murray Hill, N.J.

[21] Appl. No.: 664,244

[22] Filed: Mar. 4, 1991

[51] Int. Cl.$^5$ .......................... H04K 1/02; H04L 9/06; H04L 9/30; H04M 1/57

[52] U.S. Cl. .......................................... 380/9; 380/29; 380/30; 380/49; 379/93; 379/142; 379/201; 379/245

[58] Field of Search ...................... 380/4, 9, 29, 30, 49, 380/50; 379/93, 112, 201, 207, 142, 245, 396

[56] References Cited

U.S. PATENT DOCUMENTS

| | | | |
|---|---|---|---|
| 3,570,008 | 3/1971 | Downing et al. | 395/325 |
| 4,405,829 | 9/1983 | Rivest et al. | 380/30 |
| 4,551,581 | 11/1985 | Doughty | 379/94 |
| 4,582,956 | 4/1986 | Doughty | 379/94 |
| 4,924,496 | 5/1990 | Figa et al. | 379/142 |
| 5,027,387 | 6/1991 | Moll | 379/112 |

OTHER PUBLICATIONS

Federal Information Processing Standards Publication 46, Jan. 15, 1977 Specifications for the Data Encryption Standard.

Primary Examiner—Bernarr E. Gregory
Attorney, Agent, or Firm—Michael A. Morra

[57] ABSTRACT

Telephone call identification service that safeguards the privacy of an originating station (calling party), while providing useful identifying information to a destination station (called party), is achieved by an encryption process. The encryption process includes combining the originating number with the telephone number of the destination station to form a message. Thereafter, the message is encrypted using the Data Encryption Standard (DES) or the Rivest, Shamir, Adleman (RSA) encryption algorithm to form ciphertext which is transmitted to the destination station. Using either encryption process, the ciphertext is reversible. A telephone switching office, preferably equipped with an electronic program-controlled switching system, executes the encryption algorithm and safeguards the keys used for encryption and decryption. When reversibility of the ciphertext is deemed to be undesirable, the telephone switching office uses modulo n processing of the ciphertext to render it non-reversible.

19 Claims, 7 Drawing Sheets

| $M$ | 0 | 1 | 2 | 3 | 4 | 5 | ... |
|---|---|---|---|---|---|---|---|
| $M^{13}$ | 0 | 1 | 8192 | 1594323 | 67108864 | 1220703125 | ... |
| $C = M^{13}$ modulo 77 | 0 | 1 | 30 | 38 | 53 | 26 | ... |
| $M' = C^{37}$ modulo 77 | 0 | 1 | 2 | 3 | 4 | 5 | ... |

*FIG. 6*

MESSAGE FORMAT

CALLER IDENTIFICATION SYSTEM WITH ENCRYPTION

TECHNICAL FIELD

This invention relates to communications systems serving a plurality of stations, and more particularly to a method and apparatus for providing calling party identification information to a called station.

BACKGROUND OF THE INVENTION

Transmitting the telephone number of an originating station (calling party) to a destination station (called party) was initially hailed to be an important advance in protecting the privacy of victims of obscene and harassing phone calls. Repeated telemarketing calls could be avoided and even computers would be better protected by an ability to refuse calls from all but a few originating stations. Additionally, recognition of the telephone number of the originating station could be used to provide distinctive ringing-a special ringing signal that occurs when the originating number matches a telephone number stored within the call identification equipment.

A number of patents have issued which illustrate implementations of calling line identification service (Caller I.D.). For example U.S. Pat. No. 4,551,581, issued to C. A. Doughty on Nov. 5, 1985, discloses an apparatus and method used at a telephone company office for identifying and forwarding the telephone number of the calling party during a silent interval between ringing; and U.S. Pat. No. 4,924,496, issued to R. Figa et al. on May 8, 1990, discloses a telephone station that detects and displays the originating number as well as the name of the party associated therewith.

Although this technology is growing rapidly, it has not been universally embraced because of concerns surrounding the privacy of the calling party. And while it would be frivolous to contend that the privacy rights of the caller exceed those of the person being called, particularly when harassment or telemarketing is the reason for the call, the State of Pennsylvania has ruled that Caller I.D. violates both the state's wiretap act (nearly identical to federal statutory provisions) and privacy rights guaranteed by the Pennsylvania and U.S. Constitution. Pennsylvania's ruling responds to a number of legitimate situations where calling party privacy is entitled to greater protection including: calls to "helplines," anonymous crime-stop information, and persons under protective custody or at a shelter. Additionally, persons with unlisted telephone numbers may be entitled to greater privacy because they pay a premium that others who allow their name, address and phone number to be published, do not.

One scheme for protecting the privacy of callers is provided by a service wherein callers first dial a "1-900" number that is automatically answered with a voice instruction to wait for dial tone and then enter "1," area code, and the number to be called. Although such traceless telephone services avoid transmission of the calling party's actual telephone number, the cost of such services is high and they appear to thwart any privacy rights that the called party might have.

Another scheme for protecting the privacy of callers is a service known as "call blocking" wherein, for a fee, a subscriber's telephone number is not forwarded. Indeed, this particular service represents the natural evolution of unlisted telephone number service. Unfortunately, the mere existence of techniques for protecting one's privacy might not be a suitable safeguard to overcome challenges based on a Constitutional right. Accordingly, it is desirable to provide Caller I.D. service while safeguarding the right of privacy for each of the parties.

SUMMARY OF THE INVENTION

Calling line identification service that safeguards the privacy of an originating station (calling party), while providing identifying information to a destination station (called party), is achieved by using encryption. The encryption process generates the same encrypted number each time a particular originating station places a telephone call to a particular destination station. Further, the encrypted number is different for each different destination station; and as a result, the privacy of the calling party is protected while still providing identification information that is useful to the called party.

In illustrative embodiments of the invention, the encryption process combines the telephone number of the originating station with the telephone number of the destination station to form a message M. Thereafter, the message M is encrypted into ciphertext C and transmitted to the destination station during the silent interval between ringing signals. This provides greater privacy to the calling party than merely encoding the originating number into the same encoded telephone number regardless of destination-a practice that encourages the creation and sale of lists that correlate calling party names and encoded telephone numbers.

In one illustrative embodiment, the Data Encryption Standard (DES) is used for encrypting the message into ciphertext. DES has the advantage that it is well known and documented. It is a private key system that is highly secure as long as the private key is kept secret. DES has the further advantage that its ciphertext output is reversible-i.e., ciphertext C can be decrypted back into the original message M using the same private key.

In another illustrative embodiment, the Rivest, Shamir, Adleman algorithm (RSA) is used for encrypting the message into ciphertext. RSA uses a public key for encryption; although, as used in the present invention, it is kept secret. The ciphertext is reversible using a second key.

In the illustrative embodiments of the invention, a telephone switching office, preferably equipped with an electronic program-controlled switching system, performs the selected encryption process and safeguards the keys used during encryption and decryption. Further, when easy decryption of the ciphertext is deemed to be an undesirable feature, as is the case in the highest security systems, the telephone switching office employs a truncating function (modulo n arithmetic) to render the ciphertext non-reversible. Advantageously, the truncating function is used to limit the number of digits transmitted to the destination station to the same number presently being sent thus rendering existing equipment compatible with the present invention.

BRIEF DESCRIPTION OF THE DRAWING

The invention will be better understood from the following detailed description when read with reference to the drawing in which.

DETAILED DESCRIPTION

Figure 1:
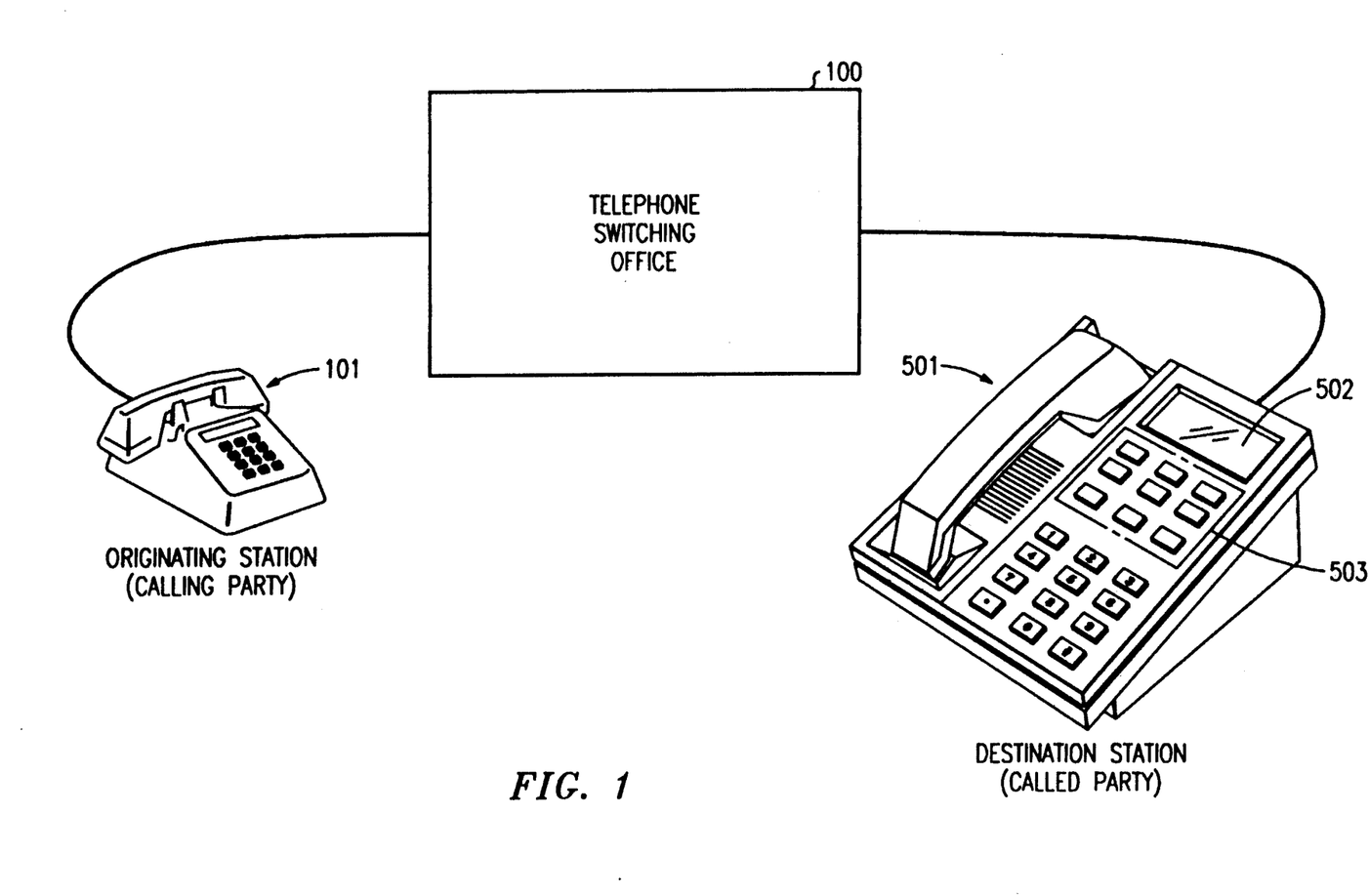
FIG. 1 discloses an overview of calling party identification service identifying the main elements of the service.

The present invention is generally implemented in a telephone switching office 100 shown in FIG. 1. By way of example, the telephone switching office 100 is suitably an electronic program-controlled switching system of the type disclosed in U.S. Pat. No. 3,570,008 to R. W. Downing et al. on Mar. 8, 1971 which is hereby incorporated by reference. Telephone switching office 100 is also disclosed in *The Bell System Technical Journal*, Vol. 43, No. 5, Parts 1 and 2, September, 1964. These citations can be referred to for a more comprehensive understanding of the construction and operation of the switching system.

FIG. 1 discloses an overview of Caller I.D. service in which telephone calls made from an originating (calling) station 101 are routed through telephone switching office 100 to destination (called) station 501. Telephone switching office 100 delivers information to station 501 regarding the telephone number of the calling party (hereinafter the "originating number") before station 501 answers. This is done between the first and second bursts of the ringing signal. Associated with station 501 is display 502 which displays the originating number. Reference is made to U.S. Pat. No. 4,551,581 issued on Nov. 5, 1985 to C. A. Doughty et al. which is entitled: Method and Apparatus for Displaying at a Selected Station Special Service Information During a Silent Interval Between Ringing. This patent provides a description of a destination station adapted to display an originating number, and is hereby incorporated by reference. Although not discussed in detail, station 501 might further include memory, alphanumeric keys, and distinctive ringing capability. These features allow the user to store various telephone numbers within station 501, associate a name with each stored number, and to generate a special ringing signal when the originating number matches one of the stored numbers. These features further allow station 501 to display the name associated with the originating number-generally the name of the calling party. Implementation of the later feature is discussed in U.S. Pat. No. 4,924,496. Keys in control field 503 are used for entering, deleting, scrolling, etc., information within the memory. The particular number currently being displayed by display 502 can be entered into memory by merely depressing one of the keys in field 503. Thereafter, the name of the calling party can be entered into the memory and associated with that particular number. This capability leads to an important consequence. It is not important that the number stored in memory be the actual telephone number of the calling party; so long as the same number is received each time the calling party makes a call to a particular destination station, it can be recognized as belonging to the calling party. Accordingly, telephone switching office 100 can encrypt the originating number and deliver the encrypted number to each called station to protect the privacy of the calling party while still delivering useful information to the called party. Receipt of the encrypted number leads to a number of meaningful options which do not rely on the use of the originating number itself including (i) display of the calling party's name if stored in memory, (ii) generating a distinctive ringing signal to indicate that the encrypted number is stored in memory, or (iii) inhibiting the ringing signal altogether for one or more of the encrypted numbers stored in memory.

Before discussing various encryption techniques, however, it is noted that protection of the calling party's privacy may require that the same encrypted number not be delivered to each called station. Even if different telephone switching offices were to encrypt originating numbers according to different processes, there would still be a one-to-one correspondence between originating numbers and encrypted numbers, and it would not be long before cross-reference lists were available to match the names of telephone subscribers with their encrypted telephone numbers. Such lists are valuable commodities that can be sold to any number of interested parties. Nevertheless, use of the same basic encryption process is desirable from an implementation standpoint.

In the preferred embodiment of the present invention, each originating number is converted into an encrypted number that is different for each particular destination station. This is accomplished simply by combining the originating number with the telephone number of the destination station during the encryption process. It is significant that one originating number is converted into a plurality of encrypted numbers; and yet, each destination station always receives the same encrypted number from a particular originating station.

ENCRYPTION

The purpose of any encryption algorithm is to convert confidential information (data) into a form that renders it unreadable to all except those who know how to decode the message. One simple technique involves substituting one letter of the alphabet with another for each of the letters. Such encryptions, however, are relatively easy to decrypt, even for the unsophisticated intruder. More complex techniques have arisen over the years to stay ahead of unsolicited decryption experts, and the art has progressed to the point that techniques exist that are so good that it no longer makes sense to try to unravel an encryption signal.

In general, an encryption device is one that accepts two inputs: a message to be encrypted, M, and an encryption algorithm, E. The message is transformed into an encrypted version, C, of the message (hereinafter called "ciphertext") where C=E(M).

A decryption device is one that also accepts two inputs: a ciphertext to be decrypted, C, and a decryption algorithm, D. The ciphertext is transformed into an decrypted version, M', of the ciphertext where M'=D(C), or M'+D(E(M)). The encryption and decryption algorithms are selected so that M'=M for all messages.

Data Encryption Standard (DES)

One encryption technique that has gained wide acceptance is the Data Encryption Standard (DES) that is intended for implementation in special purpose electronic devices. In 1977, the National Bureau of Standards (now NIST) issued DES as a Federal standard, and the National Security Agency has certified new products using the standard. While a relatively brief discussion of the application of DES to the invention is set forth below, a more comprehensive treatment is set forth in the Jan. 15, 1977 Federal Information Processing Standards Publication 46 (FIPS 46), entitled "Specifications for the Data Encryption Standard."

DES is a private-key scheme in which both encrypting and decrypting keys are identical and secret. DES operates on data in blocks of 64-bits, sending it through 16 stages of the algorithm before exiting as a 64-bit ciphertext. Encryption relies heavily on proper management of keys-the strings of characters that must be input to the algorithms before encryption or decryption can take place. Although the present invention does not require decryption, the encrypted number must be able to be decrypted so that, in the appropriate circumstances, an aggrieved called party can enforce his/her right of privacy. After a brief explanation of DES is given, it will be applied to the present invention.

Figure 2:
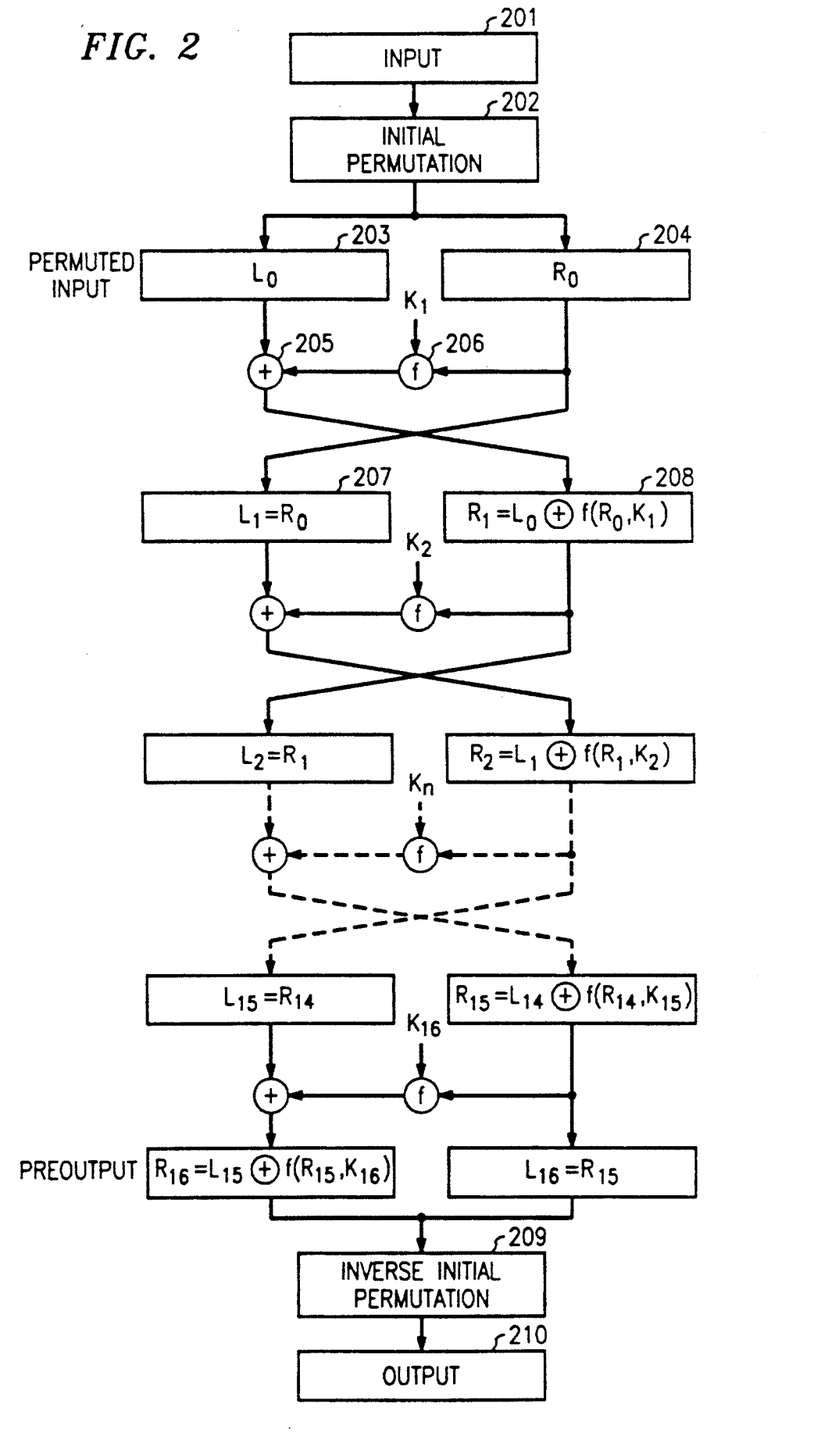
FIG. 2 is a flow diagram of the encryption process of the Data Encryption Standard.

A flow diagram that illustrates the sequential operations performed in the DES enciphering computation is shown in FIG. 2. Input box 201 comprises a 64-bit ordered set (vector) of binary digits whose order is rearranged (permuted) according to a known pattern in an operation akin to shuffling cards. The permuted block of 64-bits is now split into two blocks 203 ($L_0$) and 204 ($R_0$), each comprising 32-bits in an operation akin to cutting the cards. At this point, the card shuffling analogy fails because mathematical operations 205 (modulo 2 addition) and 206 (cipher function f) are introduced along with key K. Values for $K_1 \ldots K_{16}$ are selected in accordance with 16 different predetermined schedules whereby each $K_n$ comprises an ordered set of 48-bits chosen from the 64-bit key.

Figure 3:
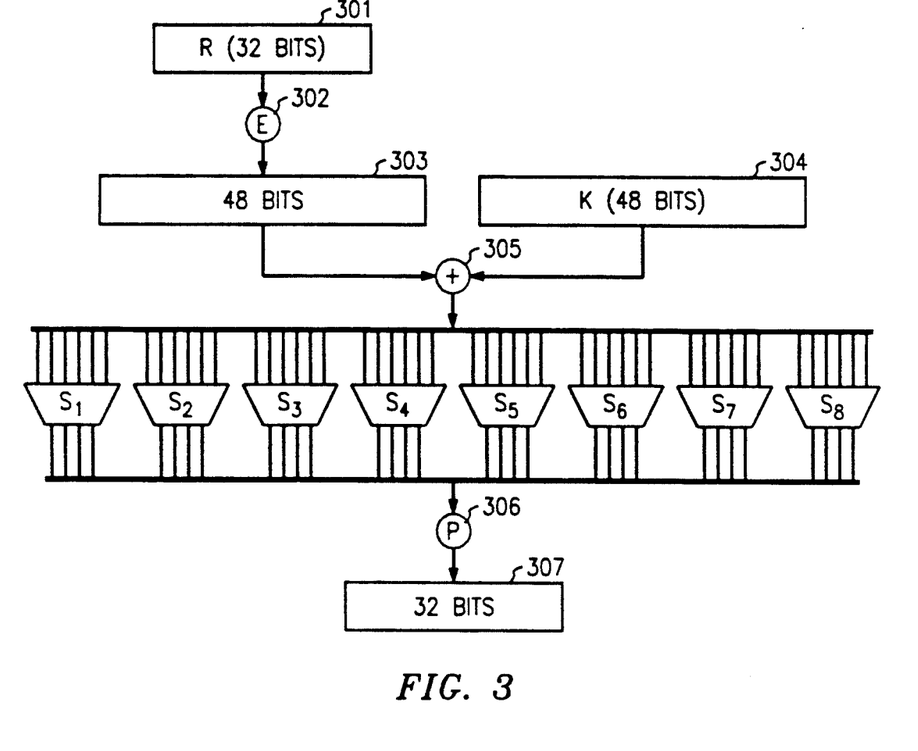
FIG. 3 is a block diagram that illustrates the calculation of f(R,K) used in the Data Encryption Standard.
Figure 4:
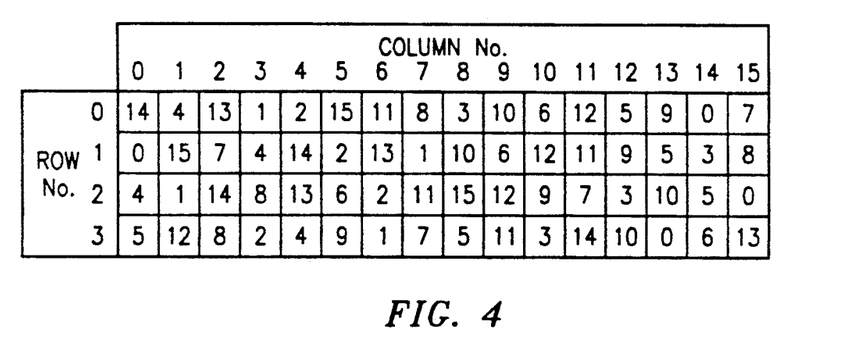
FIG. 4 discloses selection table $S_1$ used in the Data Encryption Standard.

For completeness, the operation of cipher function (f) is shown in FIG. 3 where the calculation f(R, K) is diagrammatically laid out. In this figure, E denotes a function which takes a block of 32-bits as input and yields a block of 48-bits as output. The E function is very similar to the initial permutation of box 202, but now certain of the bits are used more than once. These blocks of 48 bits, designated 303 and 304 in FIG. 3, are combined by modulo 2 (EXCLUSIVE OR) addition in box 305. Selection functions $S_1, S_2, \ldots S_8$ take a 6-bit input number and deliver a 4-bit output number in accordance with a predetermined selection table such as shown in FIG. 4 which discloses the $S_1$ function. For example, if $S_1$ is the function defined in this table and B is a block of 6 bits, then $S_1(B)$ is determined as follows: The first and last bits of B represent, in base 2, a number in the range 0 to 3. Let that number be i. The middle 4 bits of B represent, in base 2, a number in the range 0 to 15. Let that number be j. Look up in the table the number in the i'th row and j'th column. It is a number in the range 0 to 15 and is uniquely represented by a 4-bit block. That block is the output $S_1(B)$ of $S_1$ for the input B. Thus, for input 011011 the row is 01 (i.e., row 1) and the column is determined by 1101 (i.e., column 13). In row 1, column 13 the number 5 appears so that the output is 0101. Selection functions $S_1, S_2, \ldots S_8$ appear in the Appendix of the above-mentioned publication FIPS 46.

Referring once again to FIG. 3, the permutation function P is designated 306 and yields a 32-bit output (307) from a 32-bit input by permuting the bits of the input block in accordance with table P, also set forth in FIPS 46.

Figure 5:
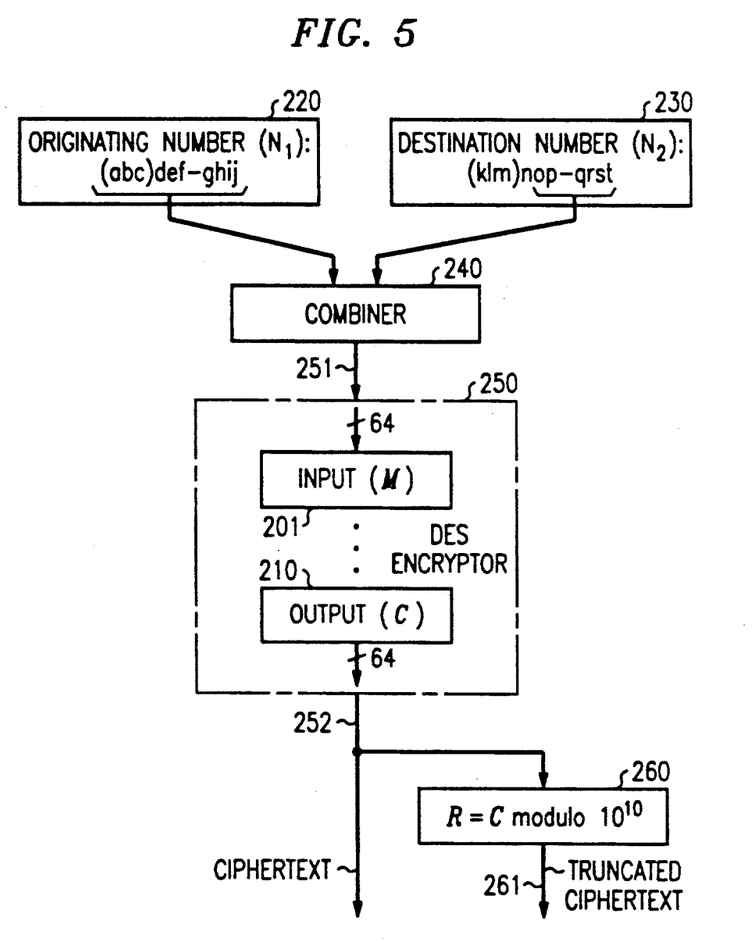
FIG. 5 discloses use of the Data Encryption Standard in connection with call party identification service.

Applying DES to the present invention is illustrated in FIG. 5. Originating number $N_1$ shown in block 220 comprises area code (abc) followed by digits def-ghij, each of which represents a single digit between 0-9 inclusive. Destination number $N_2$ shown in block 230 is similarly structured. In this illustrative example, all of the originating number digits will be combined, in combiner 240, with six of the destination number digits for a total of 16 digits. In the present invention, these numbers are combined by stringing their digits together serially; however, they may be combined in a variety of ways including, but not limited to, (i) interleaving the digits of $N_1$ with digits of $N_2$ in any predetermined manner, or (ii) performing a predetermined mathematical operation, such as adding a secret number to $N_1$ or $N_2$ or both before or after interleaving their digits. The resulting number, hereinafter designated as the combined number M, is illustratively a decimal number that is thereafter converted into binary from using wellknown, decimal-to-binary conversion—a process that encodes each decimal number 0-9 into its binary equivalent. For example, decimal "9" converts to binary "1001." Input line 251 to DES encryptor 250 is 64-bits wide, corresponding to 16 digits that are each 4-bits wide. As discussed in connection with FIG. 2, the DES algorithm E encrypts the 64-bit message M in block 201 into the ciphertext C in block 210—a process that is mathematically stated by the equation C=E(M). The output signal in block 210 is available, in 64-bit wide binary form, on line 252 for delivery to the destination station. This may proceed in several ways—each having different requirements and consequences.

Delivering the 64-bit output signal on line 252 requires parallel-to-serial conversion at the telephone switching office, and storage of 64 bits at the destination station for each encrypted number. It is noted that existing Caller I.D. equipment only needs to store 40 bits for each originating number. Furthermore, the 64 bits are straight binary and not binary coded decimal (BCD) as in existing Caller I.D. equipment. For compatibility with existing equipment, the 64-bit signal on line 252 can be truncated via block 260 which essentially divides the decimal equivalent of the signal on line 252 by 10 billion (i.e., $10^{10}$) and whose output on line 261 is the remainder of such division—a 10-digit decimal number suitable for use by existing Caller I.D. equipment.

A consequence of truncation is that the encryption process is nonreversible, which is to say that the encrypted number cannot be used to uniquely determine the originating number/destination number combination designated M in block 201. This may be an insignificant consequence, however, because the telephone switching offices that are best able to provide the encryption service of the present invention also provide number tracing service which is activated by depressing certain keys on the telephone set after terminating the call which is to be traced.

Rivest, Shamir, Adleman (RSA)

RSA is a public-key cryptosystem in which the encryption key is generally known but the decryption key is secret. Since there is no reason to make the encryption key public in connection with the present invention, security is enhanced by keeping it secret. Although a brief discussion is included herein, more detail surrounding the RSA encryption technique is disclosed in U.S. Pat. No. 4,405,829, issued to R. L. Rivest et al. on Sep. 20, 1983.

The security of RSA encryption is based on the problem of factoring a large number, or finding all the prime numbers that divide it evenly. (A prime number is an integer that is divisible only by 1 and itself.) Although finding large prime numbers is computationally easy, factoring the product of two such numbers is, at present, computationally infeasible. Encryption involves selection of two large random prime numbers p, q. The product, n, of these two numbers and another random number e are placed in a public file as the user's encryption key (e, n). To apply the key, message M is first converted into a string of numbers which are then broken into blocks $M_1, M_2 \ldots$ where $0 < M_i < n-1$. For each $M_i$, the ciphertext number $C_i = M_i^e$ modulo n. For example, if p=7, q=11 and e=13, then the public encryption key is (13, 77). Using this encryption key, a value of $M_i=2$ is encrypted into a value of $C_i=30$ because $30 = 2^{13}$ modulo 77.

Figure 6:
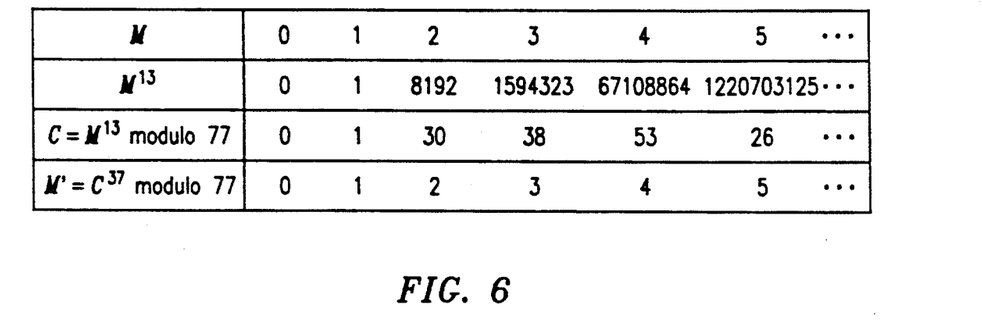
FIG. 6 illustrates RSA encryption using exponentiation and modular arithmetic.

FIG. 6 illustrates RSA encryption using exponentiation and modular arithmetic. Although modular arithmetic sounds exotic, it is fairly simple to understand and to implement. For example, x modulo y is shorthand notation for dividing x by y and recording the remainder-obviously a number less than y. More particularly, 8192 modulo 77=30, which is what remains after 77 divides into 8192 one hundred and six times. It is noted that the relationship between M and $M^e$ modulo n is unique, so that for each value of M there is only one value of $M^e$ modulo n. Proper selection of p, q and e renders the encrypted message computationally infeasible to decrypt. Selection of these number is illustrated briefly in FIG. 9 (see blocks 920, 940), and discussed in great detail in U.S. Pat. No. 4,405,829. As will be shown below, knowledge of (e,n), and the factors used in forming n, allow the encrypted message to be readily decrypted. First, however, RSA encryption will be discussed.

Figure 9:
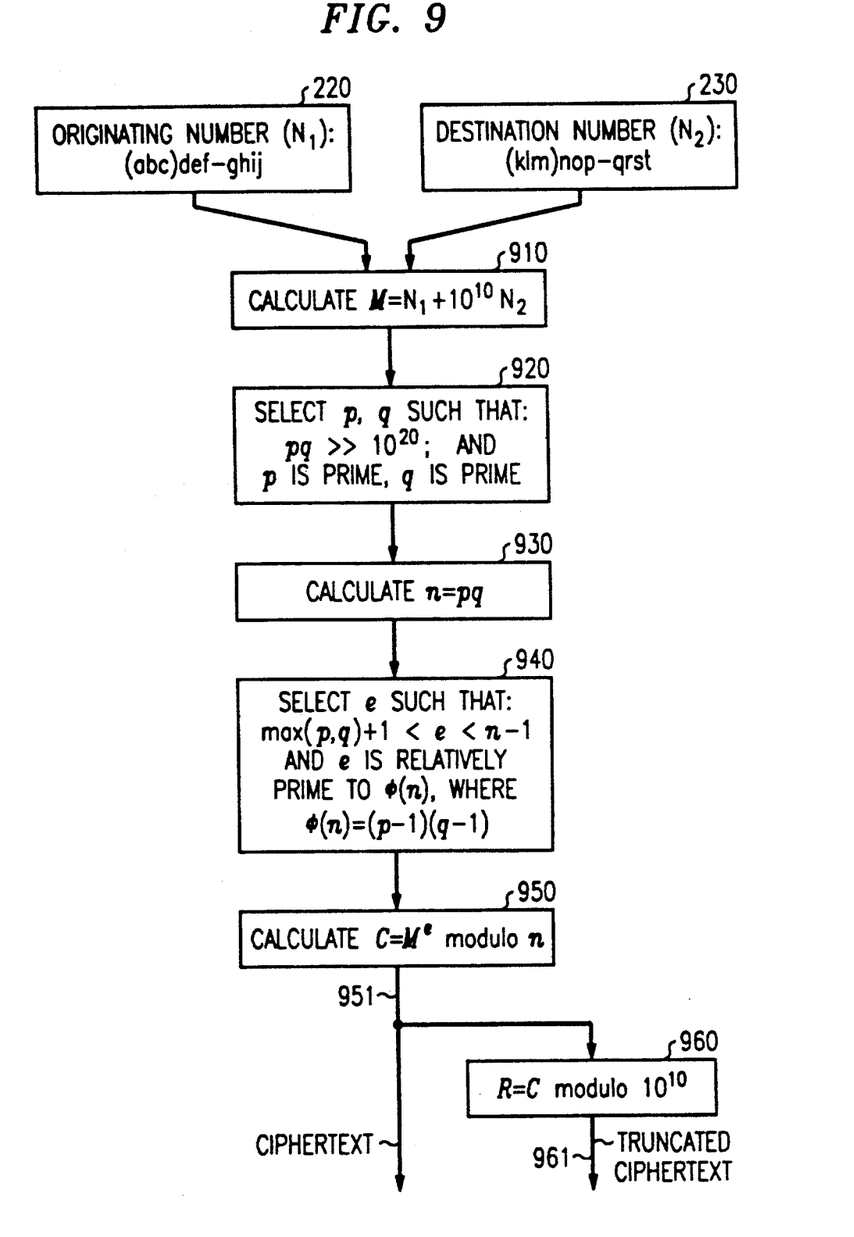
FIG. 9 is a flow diagram of the enciphering computation of the Rivest, Shamir, Adleman encryption process.

Applying RSA encryption to the present invention is illustrated in FIG. 9 using the same originating number $N_1$ shown in block 220, and destination number $N_2$ shown in block 230, that were used in connection with the DES algorithm disclosed in FIG. 5. These numbers are illustratively combined by stringing them together, as shown in block 910, to form a single message number M. Referring to block 920, RSA requires that the values for p, q be selected where p, q are large prime numbers- large enough so that their product, n, is larger than any value of M. Since the largest $N_i$ in this example is $10^{10}-1$, then $n > 10^{20}$ Block 930 then requires that a value for n be calculated.

A value for e is now selected to satisfy the inequality $$\max(p,q) + 1 < e < n - 1$$

where e is relatively prime with respect to $\phi(n)$; and $$\phi(n) = (p-1)(q-1).$$

Ciphertext C results from the calculation $C = M^e$ modulo n as shown in block 950 which is made available on line 951 and delivered to the destination station in the same manner that U.S. Pat. No. 4,551,581 delivers the originating number to the called party—i.e., using frequency shift keyed modulation between the first and second bursts of the ringing signal. The ciphertext C is truncated in block 960 by modulo $10^{10}$ arithmetic to generate truncated ciphertext R on output line 961. As discussed above, such a truncated number comprises a maximum of ten decimal digits that is suitable for use by existing Caller I.D. equipment.

DECRYPTION

Different levels of security are possible based on the particular encryption process used and the degree of care exercised in keeping the process secret. In some situations where maximum security is required, but keeping the process secret requires too much on-going effort, the best course of action is to make the resulting ciphertext non-reversible. That is to say, select an encryption process in which the output ciphertext cannot be inserted into a decryption process that generates the original message, e.g., the originating telephone number of the present invention. As discussed above, truncation of the ciphertext advantageously achieves this goal. Furthermore, truncation can be used to assure that the number delivered to the destination station has the same amount of digits, or less, than the originating number so that existing Caller I.D. equipment can be used for display.

In other situations where maximum security is not required, and where it does not matter whether existing Caller I.D. equipment can be used, then delivering a ciphertext number that can be decrypted may be desirable. Such decryption, however, might only be performed by the telephone company upon police request. Both DES and RSA are capable of unique and rapid decryption-provided the ciphertext has not been truncated.

DES Decryption

Decrypting DES-generated ciphertext is accomplished by using the same key as used for encryption, but with the schedule of addressing the key bits altered so that the decrypting process is the reverse of the encrypting process. DES decryption proceeds by applying the very same algorithm to a DES-encrypted message block as indicated in FIG. 2, taking care that at each iteration of the computation of the same block of the key bits K is used during decryption as was used during encryption of the block. Referring to FIG. 2, during decryption, blocks 203, 204 now contain $R_{16}$, $L_{16}$, respectively, as the permuted input (note that during encryption, these blocks contained $L_0$, $R_0$ respectively); and $K_{16}$ is used in the first iteration, $K_{15}$ in the second and so on, with $K_1$ used on the 16th iteration. Output 210 of the decrypting process thus contains the 64-bit number that was originally inserted into block 201 during encryption.

RSA Decryption

Decrypting RSA-generated ciphertext is accomplished using a private key (d, n) that is related to the public key (e, n) according to the following equations:

$$d = e^{-1} \text{ modulo} \phi(n)$$

where: $\phi(n) = (p-1)(q-1)$; and $$n = pq$$

Decryption of ciphertext C into the original message only requires solving the following equation:

$$M' = C^d \text{ modulo } n.$$

It is noted that the number $\phi(n)$ is a well-known object in number theory called Euler's totient function. This function is defined as the number of integers between 1 and n that have no common factor with n. If $n = pq$, and p, q are prime numbers, then $\phi(n) = \phi(p)\phi(q) = (p-1)(q-1)$.

SIGNAL PROCESSING

Figure 7:
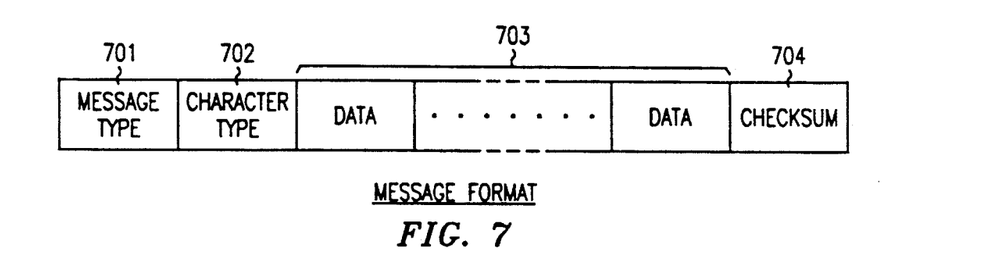
FIG. 7 discloses the message character format of digital information sent from a telephone switching office to a destination station.

Reference is now made to FIG. 7 which discloses one particular format for transmitting a message, such as an encrypted number, from a telephone switching office to a destination station. The message comprises a plurality of 8-bit characters, each preceded by a start bit and followed by a stop bit. The first 8-bit character 701 represents the message type such as an originating station telephone number or an encrypted version of same, an alphanumeric message, special service indication, etc. The second character, character count 702 represents the number of subsequent data characters contained in the message followed by checksum 704. When data characters 703 represent, for example, the digits of the originating station telephone number or the encrypted number, each 8-bit character (byte) represents two digits of the number starting with the highest order digit of the number. Each digit is encoded as a 4-bit BCD character. The last character of the message, checksum 704, is the two's complement of the modulo 256 total of the character bytes of the message. Thus, when all the characters of the message are totaled, the sum should be zero if the message was received correctly. This serial data message is transmitted to the destination station during the first silent interval between intermittent ringing signals as shown in FIG. 8.

Figure 8:
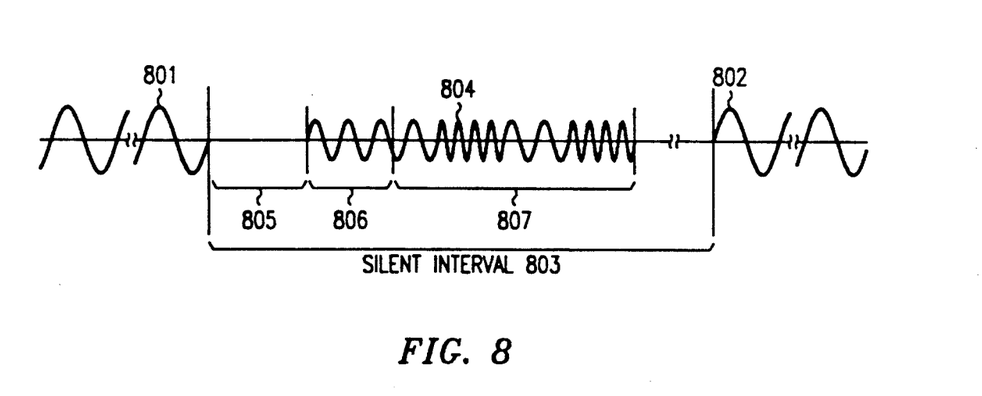
FIG. 8 illustrates a frequency shift keyed signal which is used to communicate the digital information to the destination station during the silent interval between ringing signals.

Graphically shown in FIG. 8 are intermittent ringing signals 801 and 802, plotted with respect to time, with silent interval 803 therebetween. This ringing signal is transmitted by the telephone switching office and comprises a 20-Hz, 86-volt RMS sine wave superimposed on −48 volts. Each ringing signal 801, 802 occurs for a time period of approximately two seconds followed by a silent interval 803 of approximately four seconds in duration.

Frequency shift keyed (FSK) signal 804, shown in FIG. 8, represents the serial data message and comprises two carrier frequencies such as 2025 Hz and 2225 Hz which represent binary logic levels "0" and "1" of the serial data message. This signal is transmitted from the telephone switching office by a data transmitter such as described in U.S. Pat. No. 4,551,581 and received at a destination station in a manner such as described in U.S. Pat. No. 4,582,956. As shown, FSK signal 804 is received a short time interval 805 after ringing signal 801 ends. This short time interval lasts, for example, 300 to 350 milliseconds to allow the destination station to reach a steady state condition. During time interval 806, a single frequency unmodulated FSK signal is received by the destination station to initialize its data receiver. During subsequent time interval 807, a modulated FSK signal is received with represents the serial data message.

Figure 10:
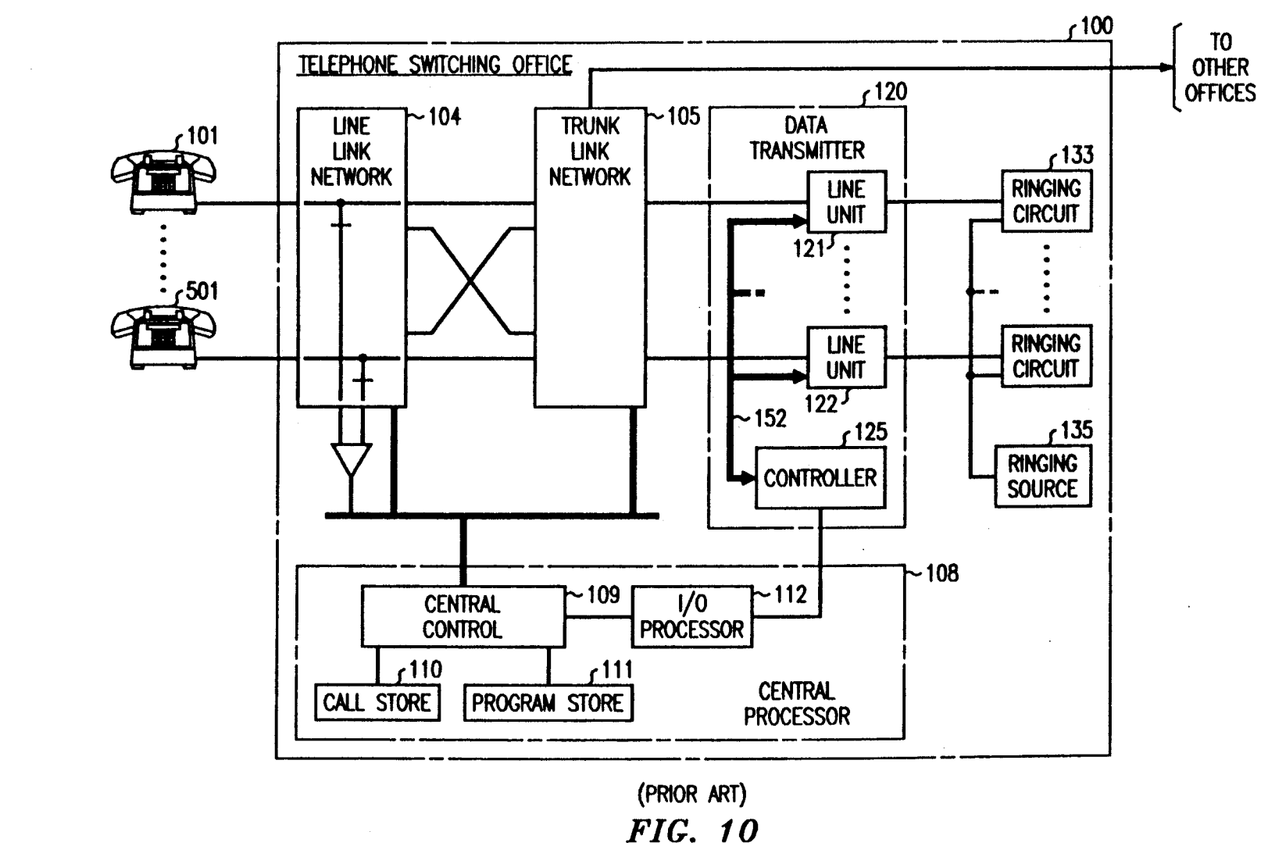
FIG. 10 shows, in block diagram form, a typical stored program-controlled telephone switching office equipped with a data transmitter for sending data messages to a destination station.

Referring now to FIG. 10, a brief description of a stored program-controlled switching system is given. The present invention is preferably implemented in software in such a system. Telephone switching office 100 comprises line link network 104, trunk link network 105, and a stored program-controlled processor 108. Line link network 104 provides other terminations for customer stations such as 101 and 501, while trunk link network 105 provides terminations for interoffice trunks. Under control of central processor 108, any customer may be selectively connected through the line and trunk link networks to a ringing circuit 133 which transmits intermittent ringing signals to the connected station. Between each pair of ringing signals is a silent interval, or more particularly, a period of time in which a ringing signal is not present. Consequently, a station commonly receives a two-second burst of a 20-Hz ringing signal followed by four seconds of silence. This sequence of ringing and silence is normally repeated until the customer at the destination station answers or the caller abandons the call. Connected to each of the ringing circuits is ringing source 135 for generating the ringing signals. Coupling the ringing circuits to the trunk link network is data transmitter 120 which sends data messages from processor 108 to the connected station during the silent interval between ringing signals. These messages include special service information such as the directory number of the originating station or the encrypted version of same.

The majority of the logic, control, storage, supervisory, and translation functions required for the operation of this system are performed by central processor 108. A typical central processor suitable for use in the illustrative switching system is described in *The Bell System Technical Journal*, Vol. 56, No. 2, February, 1977. Processor 108 is a data processing facility and can functionally be divided into central control 119, call store 110, program store 111, and input/output (I/O) processor 112 plus maintenance apparatus which is omitted to simplify the drawing. Of particular importance is program store 111 which is a memory for storing instructions which direct the central control to sequentially perform its many functions including message encryption.

Central control 109 is the information processing unit of the system that executes the program instructions stored in program store 111 using temporary information stored in call store 110.

Call store 110 is a memory for storing translation and routing information in addition to temporary information relating to calls in progress and special services. For example, this temporary information includes the busy/idle status of circuits and stations, and the directory numbers of originating and destination stations.

I/O processor 112 interfaces with peripheral units such as data transmitter 120 via serial data links. For example, responsive to a message from central control 109, the I/O processor 112 sends the encrypted number (ciphertext) to controller 125 within data transmitter 120 which further includes a plurality of line units 121, 122. Line unit 121 connects the tip and ring leads of ringing circuit 133 to terminations on trunk link network 105 which are selectively connected to the tip and ring leads of a destination station 501. Thus coupled to the tip and ring leads of ringing circuit 133 and destination station 501, line unit 121 transmits either the directory number of the origination station, the encrypted directory number (ciphertext), truncated ciphertext, or other special service information using well-known FSK signaling. The FSK signal represents the binary logic levels of special service information which are received from controller 125 via data bus 152.

Although particular embodiments of the invention have been shown and described, it is understood that various modifications are possible within its spirit and scope. These modifications include, but are not limited to: the use of other encryption algorithms of greater or lesser complexity than DES and RSA; the use of originating station and destination identifiers other than their telephone numbers; and the use of originating and/or destination identifiers as keys in the encryption algorithm rather than as the message input.

I claim:

1. A system for providing Calling Party Identification information to a called party, the calling party being at an originating telephone station and the called party being at a destination telephone station, the originating station and the destination station each having unique identity information associated therewith, CHARACTERIZED BY:
 means for cryptographic combining the identity information of the destination station and the originating station to generate an encrypted number; and
 means for transmitting the encrypted number to the destination station.

2. The system of claim 1 wherein the identity information associated with the originating station comprises its directory telephone number.

3. The system of claim 2 wherein the combining means includes a stored program for converting digital input data into digital output data in accordance with a predetermined encryption process, the digital input data comprising the directory telephone number of the originating station.

4. The system of claim 3 wherein the digital input data further comprises the directory telephone number of the destination station.

5. The system of claim 1 wherein the identify information associated with the destination station comprises its directory telephone number.

6. The system of claim 1 wherein the encrypted number is truncated before being provided to the destination station, whereby the number provided to the destination station is non-reversible for improved privacy.

7. The system of claim 6 wherein modulo n processing is used for truncating the encrypted number.

8. A method for providing information regarding the identity of a calling party at an originating telephone station to a called party at a destination telephone station, the originating station having an originating telephone number and the destination station having a destination telephone number, the method comprising the following steps:
 encrypting the originating telephone number into a first encrypted number each time the originating station originates a telephone call to a first destination station; and
 encrypting the originating telephone number into a second encrypted number each time the originating station originates a telephone call to a second destination station.

9. A method for providing information regarding the identity of a calling party at an originating telephone station to a called party at a destination telephone station, the originating station having an originating telephone number and the destination station having a destination telephone number, the method comprising the following steps:
 combining the originating telephone number and the destination telephone number to form a data message;
 encrypting the data message to form an encrypted number; and
 transmitting the encrypted number to the destination station.

10. A method for providing information regarding the identity of a calling party at an originating telephone station to a called party at a destination telephone station, the originating station having an originating telephone number and the destination station having a destination telephone number, the method comprising the following steps:
 combining the originating telephone number and the destination telephone number to form a data message;
 encrypting the data message to form an encrypted number;
 truncating the encrypted number to form a truncated number; and
 transmitting the truncated number to the destination station.

11. Apparatus for generating a data message including information regarding the identity of a call originating station and transmitting said information to a destination station, CHARACTERIZED BY:
 means for cryptographic combining the identity of the call originating station and the identity of the call destination station to generate an encrypted identification signal that uniquely identifies the originating station to the destination station, said identification signal being different for each different destination station; and
 means for transmitting the encrypted identification signal to the destination station.

12. The apparatus of claim 11 wherein the identity of the call originating station comprises its directory telephone number.

13. The apparatus of claim 11 wherein the identity of the call destination station comprises its directory telephone number.

14. The apparatus of claim 11 wherein the combining means includes means for encrypting a number that is formed from the combination of the telephone numbers of the originating and destination stations.

15. The apparatus of claim 14 wherein the combining means further includes means for truncating the encrypted number.

16. For use with a telephone switching system serving a plurality of stations and having a central processor for generating calling party identification information, and also having a ringing circuit for transmitting intermittent ringing signals separated by silent intervals to a selected one of said stations, apparatus for generating special service information for transmission to the selected station comprising:

memory means storing the telephone number of a calling party station, the telephone number of the selected station, and program instructions for encrypting numbers into ciphertext;

processor means, responsive to the stored program instructions for encrypting said calling party and selected station telephone numbers into ciphertext; and     means for coupling the ciphertext to the ringing circuit during at least one of the silent intervals between intermittent ringing signals.

17. The apparatus of claim 16 wherein the program instructions for encrypting numbers into ciphertext comprise the Data Encryption Standard algorithm.

18. The apparatus of claim 16 wherein the program instructions for encrypting numbers into ciphertext comprise the Rivest, Shamir, Adleman algorithm.

19. The apparatus of claim 16 wherein the program instructions for encrypting numbers include modulo n processing of the ciphertext to achieve truncation; whereby the ciphertext is rendered non-reversible.

* * * * *